United States Patent Office 3,706,811
Patented Dec. 19, 1972

3,706,811
OXIDATIVE DEALKYLATION AND DEHYDROGENATION OF TERT-ALKYL AROMATICS
Roy B. Duke, Jr., Littleton, Colo., assignor to Marathon Oil Company, Findlay, Ohio
No Drawing. Filed Sept. 16, 1970, Ser. No. 73,250
Int. Cl. C07c 15/10
U.S. Cl. 260—669 R          23 Claims

ABSTRACT OF THE DISCLOSURE

Tert-alkyl aromatics, e.g., tert-butylbenzene, are dealkylated and dehydrogenated by passing over catalyst, e.g., copper chromite in the presence of halogen and oxygen, e.g., tert-butylbenzene in the presence of oxygen and iodine gives alpha-methylstyrene.

CROSS REFERENCES TO RELATED APPLICATIONS

U.S. patent application Ser. No. 722,170, filed April 18, 1968, now abandoned and U.S. Pat. Ser. No. 851,737 filed Aug. 20, 1969, (a continuation-in-part thereof), now U.S. Pat. 3,522,323, relates to the general field of the present invention and teaches a two-stage, halogen-promoted, oxydehydrogenation process for the preparation of monomers, e.g., styrene from ethylbenzene. U.S. patent application Ser. No. 828,351 filed May 27, 1969, now U.S. Pat. 3,646,018, describes a two-stage, halogen-promoted process for oxidatively coupling and dehydrogenating methyl-substituted aromatic and heterocyclic compounds, e.g., stilbene from toluene. U.S. Ser. No. 839,045 filed July 3, 1969 describes a two-stage, halogen-promoted oxydehydrogenation process for converting propionitrile and isobutyronitrile to acrylonitrile and methacrylonitrile, respectively. U.S. Pat. 3,651,121 describes processes for dehydrating and oxydehydrogenating alcohols, e.g., isoprene is formed by passing a tert-amyl alcohol-halogen-oxygen mixture over a catalyst.

BACKGROUND OF THE INVENTION

Field of the invention

The present invention relates to the chemistry of carbon compounds, more specifically to preparation of aryl alkenes, e.g., alpha-methylstyrene, generally classified in the United States Patent Office within Class 260, subclass 669.

Description of the prior art

Alpha-methylstyrene and other aryl alkenes have previously been produced by dehydrogenation, e.g., styrene from ethylbenzene, alpha-methylstyrene from cumene. Traditionally, it has been thought impossible to oxidize a tert-alkyl group to produce such compounds. The present process, by accomplishing such oxidation provides a new, direct, simple, and economic route to the production of valuable aryl alkenes such as alpha-methyl styrene.

Alpha-methylstyrene and other vinyl aromatic compounds useful as monomers are usually prepared by catalytic dehydrogenation, e.g., styrene from ethylbenzene, alpha-methyl-styrene from cumene. Because of the absences of alpha-hydrogen atoms, tert-alkyl aromatic compounds are not susceptible to catalytic dehydrogenation.

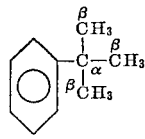

Tert-alkyl aromatic compounds are also stable to strong oxidizing agents for the same reason, i.e., the absence of alpha-hydrogen atoms. For example, it is well known that oxidizing agents as potassium permanganate, sodium dichromate, nitric acid, and the like, convert primary and secondary alkyl groups attached to an aromatic nucleus to the corresponding carboxylic acid, e.g., ethylbenzene and cumene are readily oxidized by these reagents to benzoic acid. On the other hand, even under forcing conditions, tert-butylbenzene is not attacked by these reagents. The resistance of the tert-butyl group to oxidation is further illustrated by the fact that p-tert-butyltoluene can be converted to p-tert-butylbenzoic acid in high yield with any one of the foregoing oxidizing agents.

To our knowledge, there is no report in either the chemical or patent literature concerning the oxidative dehydrogenation and dealkylation of tert-alkyl aromatic compounds. British Pat. 1,089,239, teaches the halogen-promoted, oxidative dehydrogenation and dealkylation of primary-alkyl benzenes, such as n-propylbenzene, n-butylbenzenes and the like, to styene. These compounds, unlike tert-alkyl aromatics, have alpha-hydrogen atoms. We have also observed the oxidative dehydrogenation and dealkylation reaction taught in British Pat. 1,089,239 in our two-stage, oxydehydrogenation system.

SUMMARY

General summary of the invention

According to the present invention, aryl alkenes having the general Formula I,

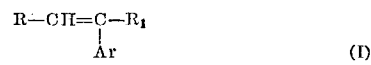

(I)

where R is hydrogen or $R_1$, and $R_1$ is an alkyl- or an alkenyl-group containing 1–20 carbon atoms, and where Ar is an aryl-group, such as phenyl or naphthyl, containing 6–20 carbon atoms including substituted aryl groups containing such substituents as methyl, —Cl, —Br, —I, —F, —CN, —$SO_3H$ or —$RSO_2$ groups, so long as the substituents do not interfere with the reaction or with the promoter and catalyst, said aryl alkenes (I) being prepared by oxidatively dealkylating and dehydrogenating tert-alkyl or tert-alkenyl compounds of the general Formula II,

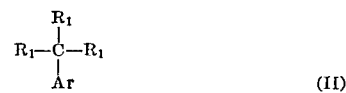

(II)

The process is preferably conducted in the vapor phase by forming a reaction mixture of the tert-alkyl aromatic compound with a halogen or halogen-containing compound and oxygen or an oxygen-containing gas, passing said mixture first through a reaction zone containing substances, such as Alundum or mullite, which are substantially inert toward reaction with the halogen and then through a reaction zone containing a metallic oxide, such as iron oxide or copper chromite, which is capable of reacting with the halogen under the reaction conditions. Alternatively, the process can be carried out by passing the reaction mixture through a reactor containing only a single reaction zone containing substances substantially inert in their reaction to the halogen. The preferred metallic oxides for use in the second zone comprise metallic salts, hydroxides, or oxides, or mixtures thereof, of the elements from Groups Ia, IIa, Ib, VIb, VIII, or the Lanthanide Series of the Periodic Table of the Elements.

The reaction is carried out at gaseous hourly space velocity of about 5 to about 1500 hr.$^{-1}$ and temperatures of from about 300° to about 1300° F.

As compared to the aforementioned prior art processes, the more direct route of the present invention reduces the equipment required for commercial production facilities and simplifies operations.

Utility of the invention

The aryl alkenes of the present invention, especially alpha-methylstyrene and substituted alpha-methylstyrene, are useful in the preparation of polymers, particularly those taught in U.S. Patent Office Class 260, subclasses 93.5 and 80.3+, see Encyclopedia of Chemical Technology, vol. 13, pp. 119–179, Interscience Publishers, New York (1954).

BRIEF DESCRIPTION OF THE DRAWINGS

Because of the nature of the present process no drawing is provided in the present specification.

DESCRIPTION OF THE PREFERRED EMBODIMENTS

Starting materials

The aromatic compounds which may be utilized as starting materials for this invention, preferably have from 4 to about 20 carbon atoms in the alkyl or alkenyl group (more preferably 4 to about 8) and will have the following general structure:

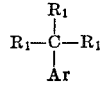

wherein $R_1$ may be an alkyl- or alkenyl group. Preferably, the alkyl- and alkenyl groups contain 1–10 carbon atoms, more preferably 1 to 8, and most preferably 1 to 3 carbon atoms. The aryl group, Ar, can contain 6 to 20 carbon atoms, more preferably 6 to 10, and most preferably, 6 carbon atoms. For example, $R_1$ can be methyl, ethyl, butyl, isopropyl, or dodecyl. Similarly, for example, Ar may be phenyl, naphthyl, anthracenyl, pyridyl, furyl, thienyl, p-chlorophenyl, or p-cyanophenyl. Ar's can be substituted, as mentioned in the summary.

The halogen promoter used in the present invention can be a halogen, e.g., iodine, bromine, chlorine, or interhalogen compounds, e.g., iodine monochloride, bromine monochloride, or hydrohalic acids, e.g., hydrogen chloride, hydrogen bromide, or hydrogen iodide. The molar ratio of halogen-to-tert-alkyl aromatic compound in the reaction mixture will preferably be between about 0.001 to about 1.0, more preferably 0.005 to about 0.10, and most preferably from about 0.01 to about 0.05. Mixtures of halogen-containing compounds may, of course, be employed.

Oxidizing agent

Oxygen, the preferred oxidizing agent, can be introduced to the reactor as pure oxygen, or as oxygen diluted with other gases such as helium, nitrogen, carbon monoxide, carbon dioxide, or as air. The molar ratio of oxygen to hydrocarbon should be from 0.01 to 3.0 or greater, and most preferably between 0.10 to about 1.2. It is also preferable to form a reaction mixture of the oxygen or oxygen-containing gas, the hydrocarbon, and the halogen or halogen-containing compound prior to introducing the reactants into the reactor.

Inert materials

In particularly preferred embodiments of the present invention, the reactor means is divided into two zones so that the vaporized starting materials first contact inert materials and then contact the catalyst. The inert materials which are useful in the practice of this invention include those materials which do not react with the halogen promoter under the conditions of the reaction. Substances such as glass, Carborundum, ceramics, mullite, Alundum, vermiculite, granular rocks, and the like fall into the category of inert materials. The reactor, however, need not necessarily be packed with one of said inert materials over which the reaction mixture is passed prior to contact with the catalyst, although this is preferable. Alternatively, the reaction mixture may be passed through tubes, pipes, and the like, made of alloys, ceramic materials, or other materials that do not react with the halogen under the conditions of the reaction, but do present contact surfaces.

Catalysts

Many catalysts are useful in the reactions of the present invention. Of the catalysts evaluated, metallic salts, oxides, and hydroxides, and mixtures thereof containing elements of Groups Ia, IIa, Ib, VIb, VIII, and the Lanthanide Series of the Periodic Table of the Elements proved superior. These preferred catalysts can, of course, be mixed together or admixed with other catalytic or inert materials. Catalyst salts and hydroxides will generally be converted to oxides during the reactions of the invention.

The preferred catalysts for use in the present invention are chromites of the general formula:

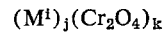

where $i$ is the valence state of metal M and $j$, and $k$ are integers such that $$j=2k/i$$

and M is preferably an element from Groups IIa, IVa, Va, or Ib through VIIb and VIII of the Periodic Table. Rare earth element chromites are also excellent catalysts. Mixtures of several chromites are also acceptable catalysts, as well as chromites containing lesser amounts of oxides, hydroxides, or salts of the elements of Group Ia of the Periodic Table.

The most preferred catalyst for use in the present invention is a copper chromite composition. The copper chromite catalysts may be modified to incorporate the synergistic effects of lesser amounts of the elements of Groups Ia, IIa, VIII and the Lanthanide Series of the Periodic Table of the Elements in the form of salts, hydroxides, or oxides. Such catalysts may be obtained commercially or may be prepared by one skilled in the art. Commercially available catalysts such as Girdler's G–22 and T–531, or Harshaw's Cu–1800 and Cu–1106 are suitable. Alternatively, the copper chromite catalysts may be prepared by thermally decomposing copper chromate, or by other methods employed by those skilled in the art. A review of the various routes to chromites may be found in the following references: Chromium, M. J. Udy, Reinhold Publishing Co., New York, 1956 and Reactions of Organic Compounds Over Copper-Chromium Oxide and Nickel Catalysts, Homer Adkins, University of Wisconsin Press, 1937. The chromite catalysts may be tableted for use in fixed bed reactors or may be pulverized and sized for use in fluidized bed reactors. The tableted catalysts may contain binders such as sodium silicate, sodium aluminate, magnesium silicate, and the like, or may be supported on carriers such as kieselguhr, alumina, silica, magnesia, zirconia, thoria, pumice, and the like. The surface areas of the catalysts range between 0.1 and 300 square meters per gram.

Reactors

The reactors used in the practice of this invention are preferably constructed of, or lined with, or otherwise contain, titanium, tantalum, nickel, or alloys containing one or more of these metals. Particularly preferred are alloys containing at least 40% nickel, 0 to 30% of the metals iron, chromium, and molybdenum, and 0 to 10% of the metals vanadium, cobalt, tantalum, and niobium, and 0–10% of the element silicon. Examples of such useful alloys of nickel include the stainless steels, the Hastelloys,* the Inconels and the Incoloys.* The reactor shape is not narrowly critical, although tubes are most convenient. In particularly preferred embodiments, the upper-portion of the reactor is packed with the inert substances such as ceramic, mullite, Carborundum, glass vermiculite, Alundum, naturally occurring granular rocks and the like, over which the reaction mixture is passed prior to entering the catalyst section of the reactor, thus providing a two-stage reactor. Alternatively, the reactants may be preheated in tubes, pipes, etc. made of the above-mentioned alloys or other materials which are substantially inert, such as clays, mullite, Alundum, or other ceramic compositions. The ratio of the volume of inert to the volume of catalyst zones can be varied to suit the particular feed and conditions employed. In general, the inert zone volume will be preferably 0.2 to 20, more preferably 0.4 to 5, and most preferably 0.6 to 2 times the volume of the catalyst.

Temperature

The reaction is preferably effected by passing the reaction mixture first through the section of the reactor containing the inert substance or void space at temperatures ranging from 300° to 1300° F., but preferably between 600° and 1200° F., and then through the section of the reactor containing the catalyst at temperatures ranging from 300° to 1300° F., but preferably between 600° and 1200° F. Most preferably, the two sections of the reactor are operated between 1000° and 1200° F. It is not necessary to operate both sections at the same temperature and in certain instances, improved yields are obtained when operating the two sections of the reactor at different temperatures.

Pressures

The reaction may be effected at pressures ranging from 0.01 to 100 atmospheres, but preferably, between 0.1 and 5 atmospheres, and most preferably at about 0.8 to about 1.2 atmospheres.

Flow rates

The flow rates of the reactants may be varied widely but, preferably, the flow rates of the hydrocarbons should range from about 0.01 to about 10 liquid volumes per volume of reactor per hour and most preferably, between about 0.10 to 1.0 liquid volumes of organic compound per volume of reactor per hour. Space velocities may also be calculated in terms of gaseous hourly space velocity, abbreviated GHSV, which is defined as the volumes of reactant vapor, calculated under standard conditions (STP), passed per hour per unit volume of the reaction zone. Inert gases, such as nitrogen and helium are considered as part of the reactant vapor. Gaseous hourly space velocities between about 5 and 1500 hrs.$^{-1}$ may be employed for the oxidative dehydrogenation reaction but, preferably, between 10 and 1000 hrs.$^{-1}$, and most preferably between 25 to 150 hrs.$^{-1}$ are used.

Batch or continuous operation

The present invention will preferably be conducted on a continuous basis, i.e., by continuously feeding the starting materials and continuously removing the products. However, in some instances, it may be preferable to produce specialized products in a batchtype reactor, e.g., an autoclave.

---

*Trademark of Hanes Stellite Co., Div. of Union Carbide Corp., 270 Park Ave., New York, N.Y. 10017; for a series of nickel-base alloys, having high resistance to corrosives, such as hot hydrochloric acid, hot sulfuric acid, wet chlorine, etc. as well as excellent physical and mechanical properties.

and *Trademarks of International Nickel Co., 71 Wall St., New York, N.Y. 10005; Inconel—an alloy containing approximately 76% nickel, 16% chromium, and 6% iron; Incoloy—an alloy containing approximately 32% nickel, 21% chromium and 46% iron.

Examples

Each of the following examples is carried out in a tubular reactor, 1″ in diameter and 36″ long, constructed of Hastelloy C alloy. The reactor has an internal thermowell, 0.25″ in diameter extending the length of the reactor. The reactor is heated in a furnace and the temperature controlled and recorded from thermocouples located inside the thermowell. The lower-half of the reactor volume was filled with a tableted coper-chromite catalyst and the upper-half with ⅛″ mullite spheres.

The starting materials, e.g., tert-butylbenzene, in which the halogen is dissolved, are fed to a mixing T by means of a calibrated metering pump and mixed in the T with air apportioned through a calibrated rotometer. The reaction mixture is then passed downward through the reactor. The flow rates were calculated in terms of gaseous hourly space velocity (GHSV). All the liquids charged to the reactor are assumed to be ideal gases at standard temperature and pressure. The oxygen-to-tert-alkyl aromatic compound ratios are molar ratios.

The reactor effluent is passed through a Graham-type, chilled-water condenser and then through a Dry Ice trap. The products are separated and analyzed by chromatographic techniques. Conversion yields and selectivities are calculated on the amount of condensable product in the following manner:

$$\text{Conversion} = \frac{100 \text{ (moles of I reacted)}}{\text{(moles of I charged)}}$$

$$\text{Yield} = \frac{100 \text{ (moles of II formed)}}{\text{(moles of I charged)}}$$

$$\text{Selectivity} = \frac{\text{yield}}{\text{conversion}}$$

EXAMPLE I

Tert-butyltoluene was oxidatively dehydrogenated and dealkylated under the following conditions:

Temperature _____ ° F__ 1150
Space velocity _____ hr.$^{-1}$__ 73
Iodine _____ percent__ 0.5
$O_2/C_{11}H_{16}$ _____ 0.62

The conversion of tert-butyltoluene was 76.2%. The yields to alpha-methylstyrene and p-methyl-alphamethylstyrene were 10.8 and 39.7% respectively. The selectivity to aryl alkenes was 0.663.

EXAMPLE II

Tert-butylbenzene was oxidatively dehydrogenated and dealkylated under the following conditions:

Temperature _____ ° F__ 1150
Space velocity _____ hr.$^{-1}$__ 72
Iodine _____ percent__ 1.0
$O_2/C_{10}H_{14}$ _____ 0.68

The conversion of tert-butylbenzene was 75.8%. The yield and selectivity to alpha-methylstyrene were 54.7% and 0.722, respectively.

EXAMPLE III

Tert-butyltoluene was oxidatively dehydrogenated and dealkylated under the following conditions:

Temperature _____ ° F__ 1100
Space velocity _____ hr.$^{-1}$__ 75
Iodine _____ percent__ 0.25
$O_2/C_{11}H_{16}$ _____ 0.50

The conversion of tert-butyltoluene was 47.6%. The yields to alpha-methylstyrene and p-methyl-alphamethylstyrene were 5.8 and 14.6%, respectively. The selectivity to aryl alkenes was 0.428.

EXAMPLE IV

Para-chloro-tret-butylbenzene was oxidatively dehydrogenated and dealkylated under the conditions described in Example II. Good yields and selectivity to p-chloro-alpha-methylstyrene were obtained.

EXAMPLE V

Para-tert-butylbenzonitrile was oxidatively dehydrogenated and dealkylated under the conditions described in Example II. Good yield and selectivity to p-cyano-alpha-methylstyrene were obtained.

Modifications of the invention

It should be understood that the invention is capable of a wide variety of modifications and variations which will be apparent to those skilled in the art upon a reading of the present specification. For example, the various specific compounds encompassed within the starting materials may, of course, be employed in admixtures. In addition, a simple single reactor zone containing either catalyst or inerts can be employed rather than the two-stage preferred reactor.

What is claimed is:

1. A process for producing aryl alkenes by the oxidative dealkylation and dehydrogenation of tert-alkyl aromatic compounds having the structure:

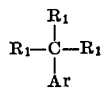

where $R_1$ is an alkyl or alkenyl group containing 1 to about 20 carbon atoms and $R_1$'s can be the same or different and where Ar is a 6 to about 20 carbon atom aryl group, and where Ar can be unsubstituted or substituted with groups which do not interfere with the reaction or the catalysts, said process being conducted in the vapor phase by passing said tert-alkyl aromatic and oxygen or an oxygen-containing gas, and a halogen or halogen-containing compound tthrough a reactor means at a gaseous hourly space velocity of from about 5 to about 1500 hr.$^{-1}$ and at temperatures of from about 300 to about 1300° F., wherein said aryl alkenes have the structure:

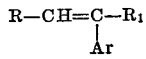

where R is $R_1$, or hydrogen.

2. The process of claim 1 wherein the reactor means is at least partially filled with inert substances which do not react with the halogen promoter under the reaction conditions.

3. The process of claim 1 wherein the reactor is at least partially filled with a catalyst comprising metallic salts of, or hydroxides of, or oxides of elements from Groups I$a$, II$a$, I$b$, VI$b$, VIII or the Lanthanide Series of the Periodic Table of the elements or mixture thereof.

4. The process of claim 3 wherein the catalyst comprises copper chromite.

5. The process of claim 3 wherein the catalyst comprises copper chromite and salts, hydroxides, or oxides of the elements of Groups I$a$, II$a$, VIII, or the Lanthanide Series of the Periodic Table of the Elements.

6. The process of claim 5 wherein the catalyst is comprised of copper chromite and a salt, oxide, or hydroxide of barium.

7. The process of claim 5 wherein the catalyst is comprised of copper chromite and oxides, hydroxides or salts of iron.

8. The process of claim 5 wherein the catalyst is comprised of copper chromite and oxides, hydroxides or salts of nickel.

9. The process of claim 5 wherein the catalyst is comprised of copper chromite and oxides, hydroxides, or salts of potassium.

10. The process of claim 5 wherein the catalyst is comprised of copper chromite and oxides, hydroxides, or salts of cerium.

11. The process of claim 1 wherein said reactor means contains an elemental metal comprising titanium, tantalum, nickel, or alloys containing these elements.

12. The process of claim 11 wherein the alloy contains at least 40% nickel, 0 to 30% of the metals iron, chromium, and molybdenum, and 0 to 10% of the metals vanadium, cobalt, tantalum, and niobium, and 0–10% of the element silicon.

13. The process of claim 1 wherein $R_1$ is methyl.

14. The process of claim 1 wherein said reactor means comprise two zones, the first consisting of either substantially free space or containing a substance substantially inert to its reaction with the halogen or halogen-containing compound, and the second zone containing said catalyst.

15. The process of claim 14 wherein the reaction mixture is passed over said inert material at a temperature of from about 600 to about 1200° F.

16. The process of claim 14 wherein the inert material of the inert stage comprises clay or ceramic compositions.

17. The process of claim 14 wherein the inert material of the inert stage is expanded hydrous silicate.

18. The process of claim 14 wherein the inert material of the inert stage is silicon carbide.

19. The process of claim 14 wherein the inert material of the inert stage is granular rock materials.

20. The process of claim 14 wherein the inert material of the inert stage is fused alumina.

21. The process of claim 14 wherein the inert material of the inert stage is alumina silicate.

22. The process of claim 1 wherein the tert-alkyl aromatic compounds comprise a compound selected from the group consisting of tert-butyltoluene, tert-butylbenzene, para-tert-butylbenzonitrile, para-chloro tert-butyltoluene, and mixtures thereof.

23. The process of claim 21 wherein the tert-alkyl aromatic compounds comprise tert-butylbenzene.

References Cited

UNITED STATES PATENTS

| | | | |
|---|---|---|---|
| 3,449,458 | 6/1969 | Tiedje et al. | 260—669 |
| 3,080,435 | 3/1963 | Nager | 260—669 |
| 3,175,016 | 3/1965 | Norton et al. | 260—672 |
| 3,247,273 | 4/1966 | Mantell et al. | 260—669 |
| 3,383,429 | 5/1968 | Noddings | 260—669 |
| 3,392,205 | 7/1968 | Platz et al. | 260—669 |

FOREIGN PATENTS

| | | | |
|---|---|---|---|
| 1,089,239 | 11/1967 | Great Britain | 260—669 |

CURTIS R. DAVIS, Primary Examiner

U.S. Cl. X.R.

260—465 K, 650 R, 672 R